United States Patent [19]
Girard

[11] Patent Number: 6,078,469
[45] Date of Patent: *Jun. 20, 2000

[54] DISK DRIVE ACTUATOR ASSEMBLY HAVING AN EXPANDABLE KEY MOUNT

[75] Inventor: Mark T. Girard, South Haven, Minn.

[73] Assignee: Hutchinson Technology Incorporated, Hutchinson, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/933,685

[22] Filed: Sep. 19, 1997

Related U.S. Application Data

[60] Provisional application No. 60/026,775, Sep. 26, 1996.

[51] Int. Cl.[7] ................................ G11B 5/48; G11B 21/16
[52] U.S. Cl. ............................................................ 360/104
[58] Field of Search .................................. 360/104, 106, 360/105; 29/603.03, 603.04

[56] References Cited

U.S. PATENT DOCUMENTS

| | | | |
|---|---|---|---|
| 4,875,117 | 10/1989 | Slezak et al. | 360/104 X |
| 4,912,583 | 3/1990 | Hinlein | 360/104 |
| 4,991,045 | 2/1991 | Oberg | 360/104 |
| 5,062,018 | 10/1991 | Yaeger | 360/104 |
| 5,185,683 | 2/1993 | Oberg et al. | 360/104 |
| 5,187,626 | 2/1993 | Hopkins et al. | 360/104 |
| 5,198,945 | 3/1993 | Blaeser et al. | 360/104 |
| 5,444,587 | 8/1995 | Johnson et al. | 360/104 |
| 5,495,375 | 2/1996 | Baasch et al. | 360/104 |
| 5,497,282 | 3/1996 | Hoffmann et al. | 360/104 |
| 5,550,694 | 8/1996 | Hyde | 360/104 |
| 5,579,190 | 11/1996 | Mastache et al. | 360/106 |
| 5,602,698 | 2/1997 | Miyazaki et al. | 360/104 |
| 5,621,590 | 4/1997 | Pace et al. | 360/106 |
| 5,631,789 | 5/1997 | Dion et al. | 360/106 |
| 5,654,851 | 8/1997 | Tucker et al. | 360/104 |
| 5,657,187 | 8/1997 | Hatch et al. | 360/104 |
| 5,657,531 | 8/1997 | Sato et al. | 29/603.04 |
| 5,666,243 | 9/1997 | Brent | 360/106 |

FOREIGN PATENT DOCUMENTS 8-124339  3/1996  Japan.

*Primary Examiner*—William R. Korzuch
*Attorney, Agent, or Firm*—Faegre & Benson LLP

[57] ABSTRACT

An actuator assembly having an actuator block, at least one elongated arm, and an expandable key for attaching the elongated arm to the actuator block. The actuator block has a connection hole formed in the block, the hole having a perimeter edge of predetermined shape. A corresponding connection hole having a perimeter edge of predetermined shape is formed in the elongated arm. The expandable key is inserted in the actuator block connection hole and the elongated arm connection hole and is transversely expanded to engage the perimeter edges of the holes. The expandable key includes a key member having a longitudinal bore. The key member is inserted through the actuator block connection hole and the elongated arm connection hole, and a driver pin is inserted in the longitudinal bore of the key member. The driver pin contacts and transversely expands the key member, thus causing the key member to engage the perimeter edges of the connection holes to secure the elongated arm to the actuator block. A plurality of elongated arms can be attached to the actuator block in this manner, and the driver pin and key member can be removed for selectively reworking and replacing one or more of the plurality of elongated arms.

13 Claims, 5 Drawing Sheets

DISK DRIVE ACTUATOR ASSEMBLY HAVING AN EXPANDABLE KEY MOUNT

REFERENCE TO RELATED APPLICATION

This application claims the benefit of U.S. Provisional Application Ser. No. 60/026,775, filed Sep. 26, 1996.

TECHNICAL FIELD

The present invention relates generally to an actuator assembly in an information storage device. In particular, the invention is a disk drive actuator assembly that includes an expandable key for mounting an elongated arm to an actuator block of the actuator assembly.

BACKGROUND OF THE INVENTION

Information storage devices are in wide spread use, and are used to store and retrieve large amounts of data. Such information storage devices generally include a rigid media for storing information, a read/write device for creating and accessing the information, and an actuator assembly for positioning the read/write device over the rigid media. One common example of such an information storage device is a hard disk drive having one or more rotating magnetic disks over each of which a head suspension and a head slider are positioned. Each of the head suspensions is attached to an actuator assembly, which positions the suspensions and sliders over the rotating disks.

An actuator assembly used in a disk drive typically includes an actuator block mounted to the frame of the information storage device, a motor for rotating the actuator block, and one or more arms, attached to the actuator block, to which a read/write device is mounted. Various methods for attaching the arms to the actuator block have been developed. One such method is known as swaging or ball staking. In this method, a boss attached at an end of an actuator arm is inserted in a hole in the actuator block. The actuator arm is then deformed and engaged with the actuator block by forcing a round ball through the boss.

Another method for attaching arms to an actuator block is demonstrated in the Hoffmann et al. patent, U.S. Pat. No. 5,497,282. The Hoffmann et al. patent shows an actuator hub having radially extending actuator arms. Each of the radially extending arms has slots formed in an edge of the arm, and a pair of bosses on the end of a mounting plate are inserted into the slots of the arm. The bosses are then swaged to connect the mounting plate to the radially extending arm.

Another method for attaching arms in an actuator assembly is shown in the Baasch et al. patent, U.S. Pat. No. 5,495,375. The Baasch et al. patent shows a plurality of arms having a C-shaped opening at an end that removably engages an actuator member. Each arm is individually self-locked into the actuator block at the C-shaped opening of the arm.

Conventional methods for attaching arms to an actuator block such as those described above, however, have certain disadvantages. Specifically, the large vertical force that must be applied to the actuator assembly to swage an arm boss into an actuator hole can warp or otherwise permanently deform the actuator block and/or the arm. In addition, arms swaged to an actuator block cannot be selectively reworked or replaced because the swaging process cannot be reversed. The use of a boss on the arms also increases the size of the actuator assembly because the spacing between the arms must be increased to accommodate the boss. Moreover, arms having a self-locking C-shaped opening such as those shown in the Baasch et al. patent may not provide sufficient torque retention to securely hold the arm in place as the actuator block quickly rotates to position the read/write device over the rigid media.

There is therefore a continuing need for an improved actuator assembly. Such an improved assembly should securely hold the elongated arms in place as the actuator block rotates. In addition, it is desirable to be able to selectively rework and replace the arms rather than replacing the entire actuator assembly. An attachment system that does not require large vertical forces to attach the arms to the actuator block and that provides an overall lower profile actuator assembly is also highly desirable.

SUMMARY OF THE INVENTION

The present invention is an actuator assembly for an information storage device. The actuator assembly generally comprises an actuator block and an elongated arm extending from the actuator block. The elongated arm supports a read/write device over rigid media in the information storage device. A connection hole having a perimeter edge of predetermined shape is formed in the actuator block. An elongated arm connection hole having a perimeter edge of predetermined shape is formed in the elongated arm and is aligned with the actuator block connection hole. An expandable key is inserted in the actuator block connection hole and the elongated arm connection hole, and is transversely expanded to engage at least a portion of the perimeter edges of the holes. The expandable key includes a key member having a longitudinal bore, and a driver pin. The driver pin is inserted in the longitudinal bore of the key member to engage and transversely expand the key member for securing the elongated arm to the actuator block.

In one embodiment, the actuator block connection hole and the elongated arm connection hole are square. The key member includes a plurality of elongated members that are engaged and expanded by the driver pin to engage the connection holes. The longitudinal bore and driver pin can be substantially cylindrical.

The actuator assembly can further include a plurality of elongated arms extending from the actuator block and secured in a similar manner. In addition, the driver pin of the actuator assembly can be removed, and the key member can be radially compressed into the longitudinal bore and removed from the connection holes to allow the selective rework and replacement of one or more elongated arms attached to the actuator block.

DETAILED DESCRIPTION OF THE PREFERRED EMBODIMENTS

Figure 1:
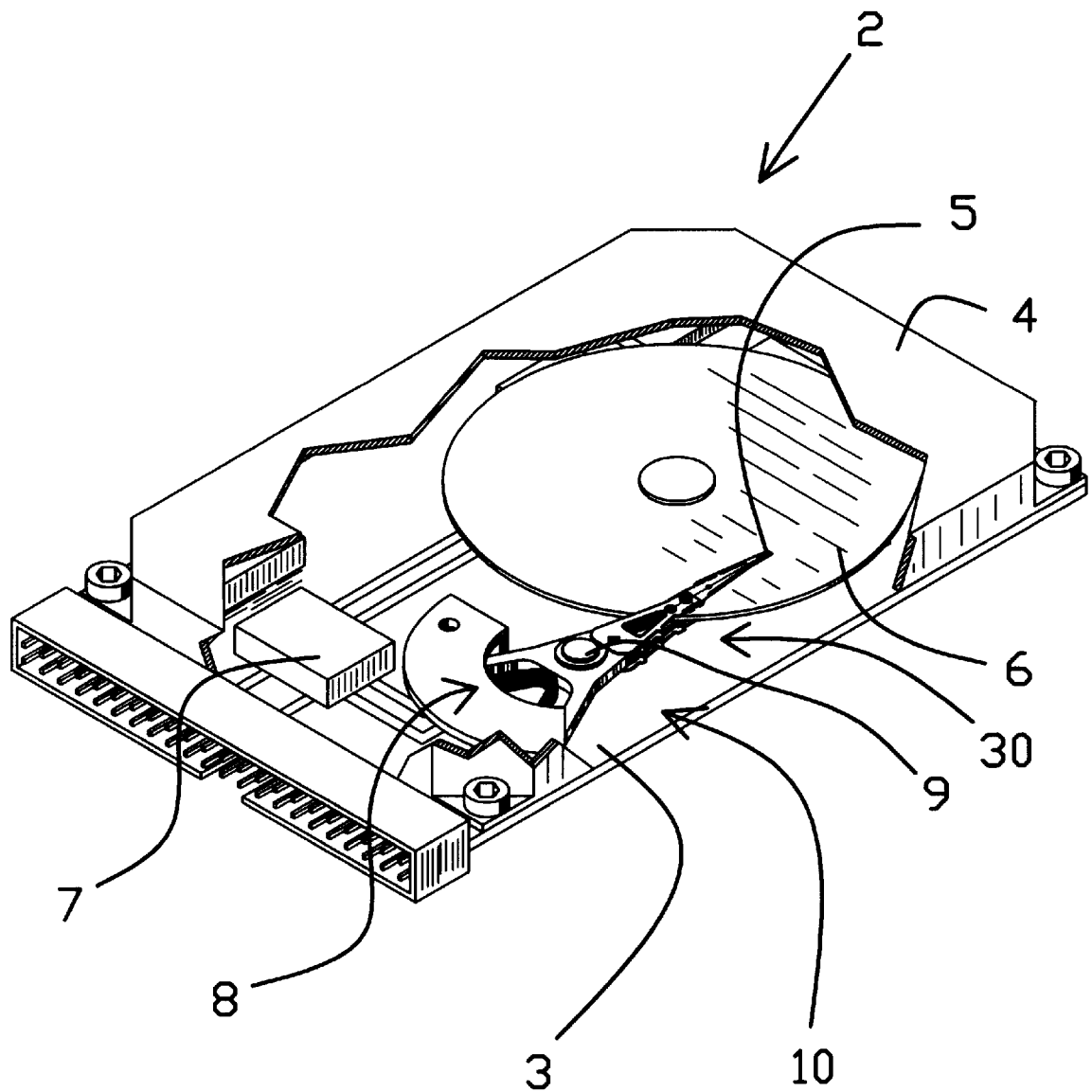
FIG. 1 is an isometric view of a rigid disk drive with portions thereof broken away to illustrate an actuator assembly in accordance with the present invention.

FIG. 1 shows an information storage device having an improved actuator assembly in accordance with the present invention. Specifically, FIG. 1 shows a rigid disk drive 2 having an actuator assembly 10 contained therein. Disk drive 2 includes a base 3, a housing 4, and a disk 6 that is rotatably mounted to base 3. A spindle 9 is rigidly attached to base 3, and actuator assembly 10 is rotatably mounted to spindle 9. A motor 8 is positioned within housing 4 and is coupled to actuator assembly 10 for rotating actuator assembly 10 in response to commands received from electronic control circuitry 7. In this manner, actuator assembly 10 positions elongated arms 30 of actuator assembly 10 at a desired location over disk 6.

Figure 2:
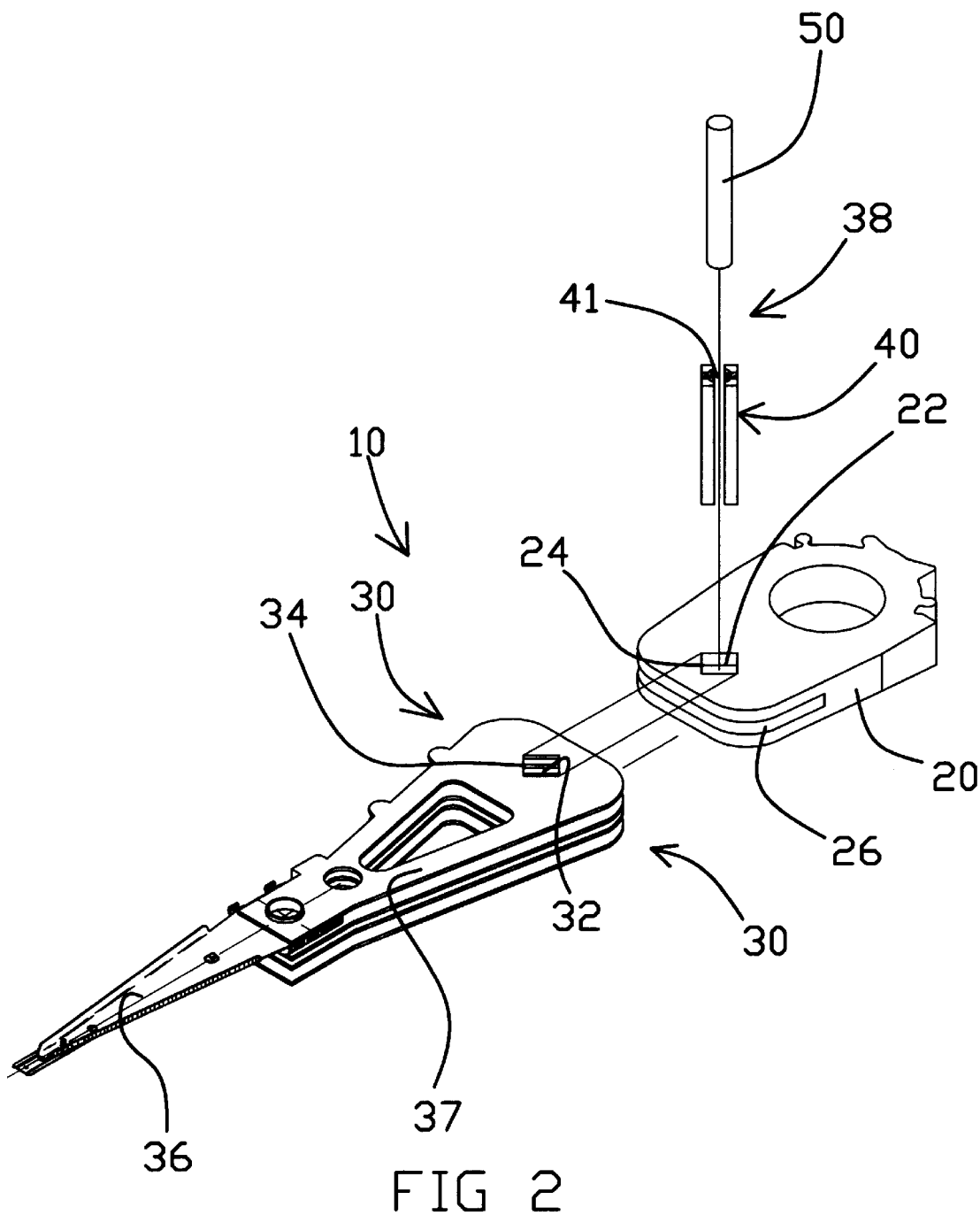
FIG. 2 is an exploded isometric view of the actuator assembly shown in FIG. 1.

FIG. 2 shows the actuator assembly 10 of FIG. 1 in greater detail. Actuator assembly 10 is comprised of an actuator block 20 and at least one elongated arm 30 attached to the actuator block 20. In the embodiment shown, four elongated arms 30 are provided for stacked attachment to actuator block 20, and a slot 26 is formed in the actuator block 20 to accommodate the middle two elongated arms 30. Additional slots can be formed in the actuator block to accommodate a greater number of elongated arms. Each elongated arm 30 is comprised of an actuator arm 37 having a proximal end that is attached to actuator block 20, and a head suspension 36 that is attached to a distal end of the actuator arm 37. As is known in the art, head suspension 36 supports a head slider 5 (not shown in FIG. 2) over the disk 6 in disk drive 2 for reading and writing data to and from the disk. While elongated arm 30 is shown comprising actuator arm 37 and suspension 36, other embodiments of an elongated arm, such as a single piece arm to which a slider or other read/write device is attached, can be used in the actuator assembly of the present invention.

Elongated arms 30 are attached to actuator block 20 with an expandable key 38 that is inserted and expanded into holes formed in the actuator assembly components. An actuator block connection hole 22 is formed in actuator block 20, and an elongated arm connection hole 32 is formed in each elongated arm 30. Actuator block connection hole 22 has a perimeter edge 24 of a predetermined shape. Elongated arm connection hole 32 similarly has a perimeter edge 34 of a predetermined shape, and is aligned with the actuator block connection hole 22. In the embodiment shown, the perimeter edge 34 of elongated arm connection hole 32 is the same size and shape as the perimeter edge 24 of actuator block connection hole 22. The shape of the perimeter edges 24 and 34 of the actuator block connection hole 22 and the elongated arm connection hole 32 are chosen so that upon the insertion and expansion of expandable key 38 into holes 22 and 32, rotation between the elongated arms 30 and the actuator block 20 is prevented. Toward this end, the perimeter edge 24 of actuator block connection hole 22 and the perimeter edge 34 of elongated arm connection hole 32 preferably have at least one linear side that is engaged by expandable key 38, and can be polygon shaped. In the embodiment shown, actuator block connection hole 22 and elongated arm connection hole 32 are square apertures having four linear sides. While in the embodiment of FIGS. 1 and 2 the perimeter edge 34 of elongated arm connection hole 32 is the same size and shape as perimeter edge 24 of actuator arm connection hole 22, other shapes and configurations for actuator block connection hole 22 and elongated arm connection hole 32 can be used so long as at least a portion of the perimeter edges 24 and 34 of holes 22 and 32, respectively, is engaged by the expandable key 38 to secure elongated arm 30 to actuator block 20.

Expandable key 38 is inserted in actuator block connection hole 22 and elongated arm connection hole 32 of each elongated arm 30, and expandable key 38 is transversely expanded to secure the elongated arms 30 to actuator block 20. Expandable key 38 is comprised of a key member 40 and a driver pin 50. Key member 40 is inserted in the actuator block hole 22 and elongated arm hole 32 to engage at least a portion of the perimeter edges 24 and 34 of the connection holes 22 and 32. Toward this end, key member 40 is sized and shaped to correspond to at least a portion of the predetermined shape of the perimeter edges 24 and 34 of actuator block connection hole 22 and elongated arm connection hole 32, respectively. Key member 40 preferably engages the at least one linear side of edges 24 and 34. In the embodiment shown, key member 40 is the same size and shape as actuator block connection hole 22 and elongated arm connection hole 32 (i.e. square). Other shapes of key member 40 can of course be used so long as portions of the perimeter edges 24 and 34 of the connection holes 22 and 32, respectively, are engaged by key member 40.

Key member 40 includes a longitudinal bore 41, and driver pin 50 is inserted into longitudinal bore 41 to transversely expand key member 40. In the embodiment shown, longitudinal bore 41 is symmetric about the longitudinal axis of key member 40, and bore 41 is cylindrically shaped having a first diameter. Driver pin 50 is also substantially cylindrical, and has a diameter that is slightly greater than the diameter of the cylindrical longitudinal bore 41. In this manner, when driver pin 50 is inserted into longitudinal bore 41 driver pin 50 uniformly expands key member 40 in a transverse direction to engage the linear sides of perimeter edges 24 and 34 of actuator block connection hole 22 and elongated arm connection hole 32, respectively.

Figure 3:
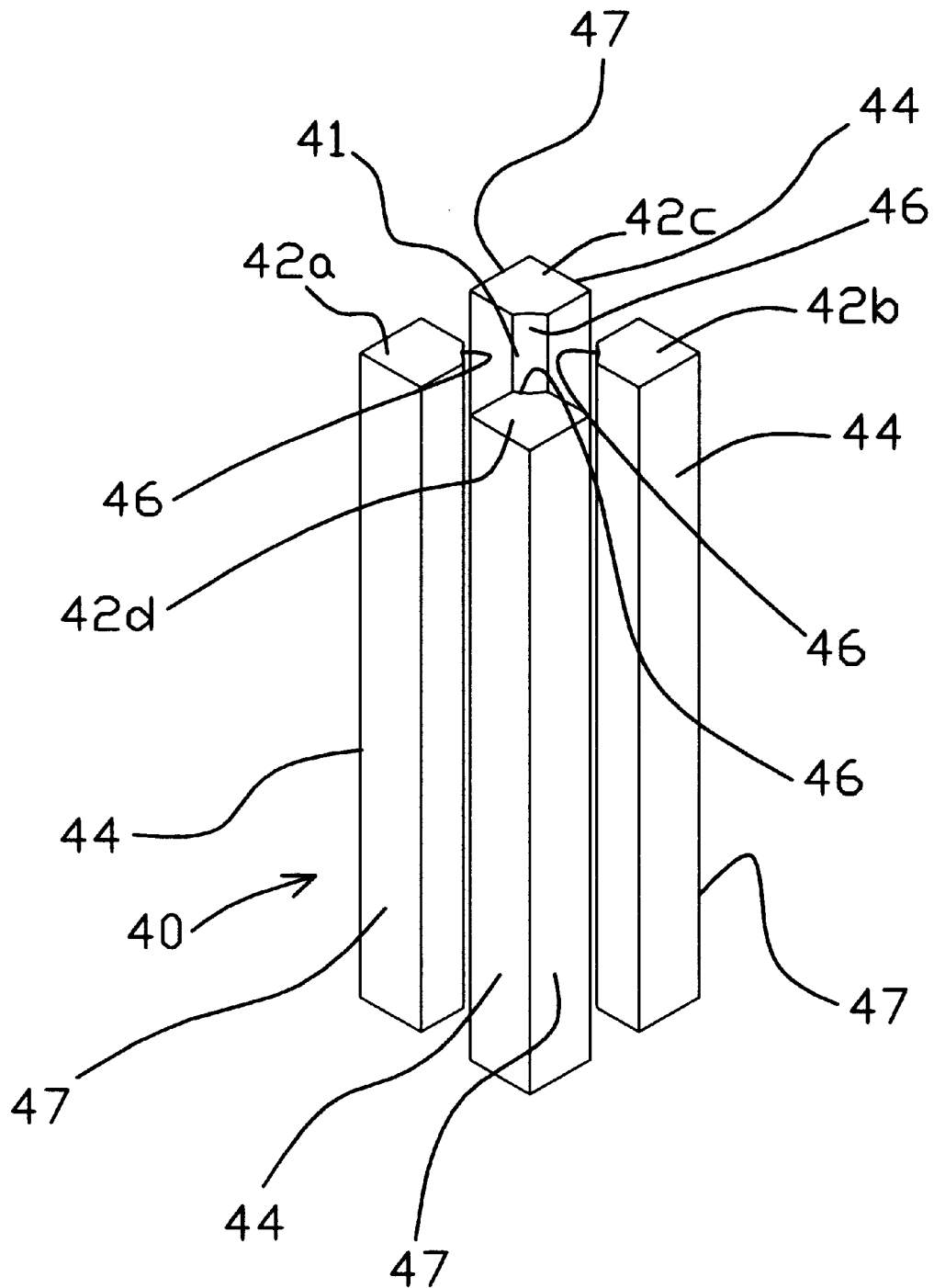
FIG. 3 is an isometric view of an expandable key member of the actuator assembly shown in FIG. 2.

As shown in greater detail in FIG. 3, key member 40 can include a plurality of elongated members 42a–42d, each of which has at least a first surface 44 and a second surface 46. In the embodiment shown, elongated members 42a–42d additionally include a third surface 47 so that expandable key 38 matches the square shape of the actuator block connection hole 22 and elongated arm connection hole 32. First surface 44 and third surface 47 of elongated members 42a–42d engage the perimeter edge 24 and 34 of connection holes 22 and 32, respectively, while second surface 46 of members 42a–42d is in contact with driver pin 50. As explained above, driver pin 50 is sized and shaped so that, when inserted in longitudinal bore 41, driver pin 50 engages second surface 46 and transversely expands key members 42a–42d to engage first surface 44 and third surface 47 of the elongated members with the perimeter edges 24 and 34 of actuator block connection hole 22 and elongated arm connection hole 32, respectively. Toward this end, second surface 46 of each of the elongated members 42a–42d is concave, the curvature of which defines cylindrical bore 41. As explained above, bore 41 has a diameter that is slightly smaller than the diameter of the cylindrical pin 50 to transversely expand key member 40.

Key member 40 is preferably formed from a material having a hardness that is less than the hardness of driver pin 50, actuator block 20, and elongated arms 30 so that when driver pin 50 is inserted into longitudinal bore 41 and expands key member 40, key member 40 is plastically deformed around elongated arms 30 to secure the arms to actuator block 20. Toward this end, key member 40 is preferably formed from 300 series annealed stainless steel, while driver pin 50 is made of hardened stainless steel or tool steel, actuator block 20 is made from heat treated cast aluminum, and elongated arms 30 are formed from hardened stainless steel.

Figure 5:
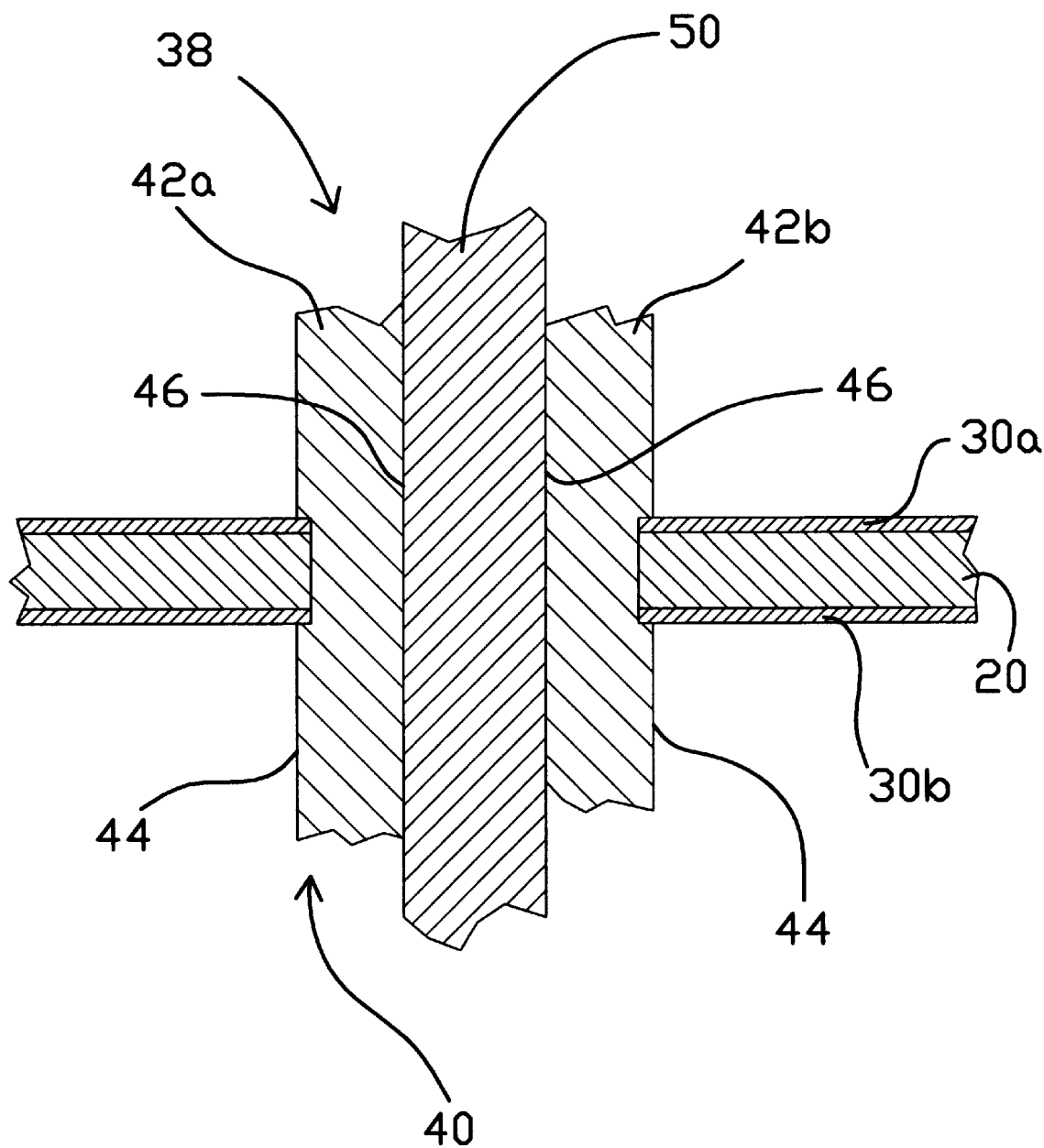
FIG. 5 is a detailed cross sectional view of a portion of an actuator assembly in accordance with the present invention showing the attachment interface between a pair of elongated arms and the actuator block.

The interface between the connection holes 22 and 32 and the expandable key 38 is perhaps best shown in FIG. 5. Specifically, FIG. 5 shows two elongated members 42*a* and 42*b* of key member 40 engaged by pin 50 at second surface 46. First surface 44 of members 42*a* and 42*b* are expanded and deformed around the top surface of an upper arm 30*a* and around the bottom surface of a lower arm 30*b*. The deformation of key member 40 around the top and bottom surfaces of the respective elongated arms vertically secures the arms to block 20. Rotational securement of arms 30 is achieved by the expansion of key member 40 into engagement with the perimeter edges of connection holes 22 and 32. In particular, as described above, the perimeter edges of connection holes 22 and 32 preferably include at least one linear side that is engaged by key member 40, and the linear side provides a transverse force that opposes the torque placed on the elongated arms due to the rotation of the actuator block.

The actuator assembly 10 of the present invention advantageously allows for the selective rework and replacement of elongated arms 30 attached to actuator block 20. Because driver pin 50 is sized and shaped to expand key member 40 as it is inserted into longitudinal bore 41, no adhesive or other securement means is necessary to hold driver pin 50 in place. As such, driver pin 50 can be removed from longitudinal bore 41 in order to selectively rework or replace those elongated arms 30 that are in need of repair. An upward axial force is applied to driver pin 50, either by pushing on the bottom of driver pin 50 or by pulling on the top of driver pin 50, to remove driver pin 50 from longitudinal bore 41. To facilitate the pulling of driver pin 50 from longitudinal bore 41, driver pin 50 can include means for receiving an upward axial force, such as a hook (not shown) on the top surface of driver pin 50. The key member 40 is then radially compressed into longitudinal bore 41 to disengage the key member 40 from elongated arm connection hole 32 and actuator block connection hole 22. Key member 40 can then be removed from the holes, and the desired elongated arms 30 are reworked or replaced. A new key member 40 is inserted into the connection holes 22 and 32, and driver pin 50 is replaced in longitudinal bore 41 to transversely expand new key member 40 and secure the elongated arms 30 to the actuator block 20.

In addition to providing for the selective replacement of individual elongated arms, there are a number of other advantages associated with the actuator assembly of the present invention. Specifically, because the elongated arms 30 are not permanently swaged into the actuator block 20, the actuator assembly 10 is not subjected to large vertical forces, and there is less chance that the actuator assembly will be warped or otherwise damaged during the manufacture of the assembly or during the replacement of individual elongated arms. In addition, because the elongated arms of the actuator assembly are not swaged to the actuator block, thinner arms can be used since there is no need to leave sufficient clearance between the arms for a swage boss. This leads to an overall thinner profile for the actuator assembly, which in turn allows the information storage device in which the actuator assembly is mounted to have an overall thinner profile. Moreover, the elongated arm and actuator block interface securely holds the elongated arms in place as the actuator assembly rotates to position the elongated arm over rigid media in an information storage device.

Figure 4:
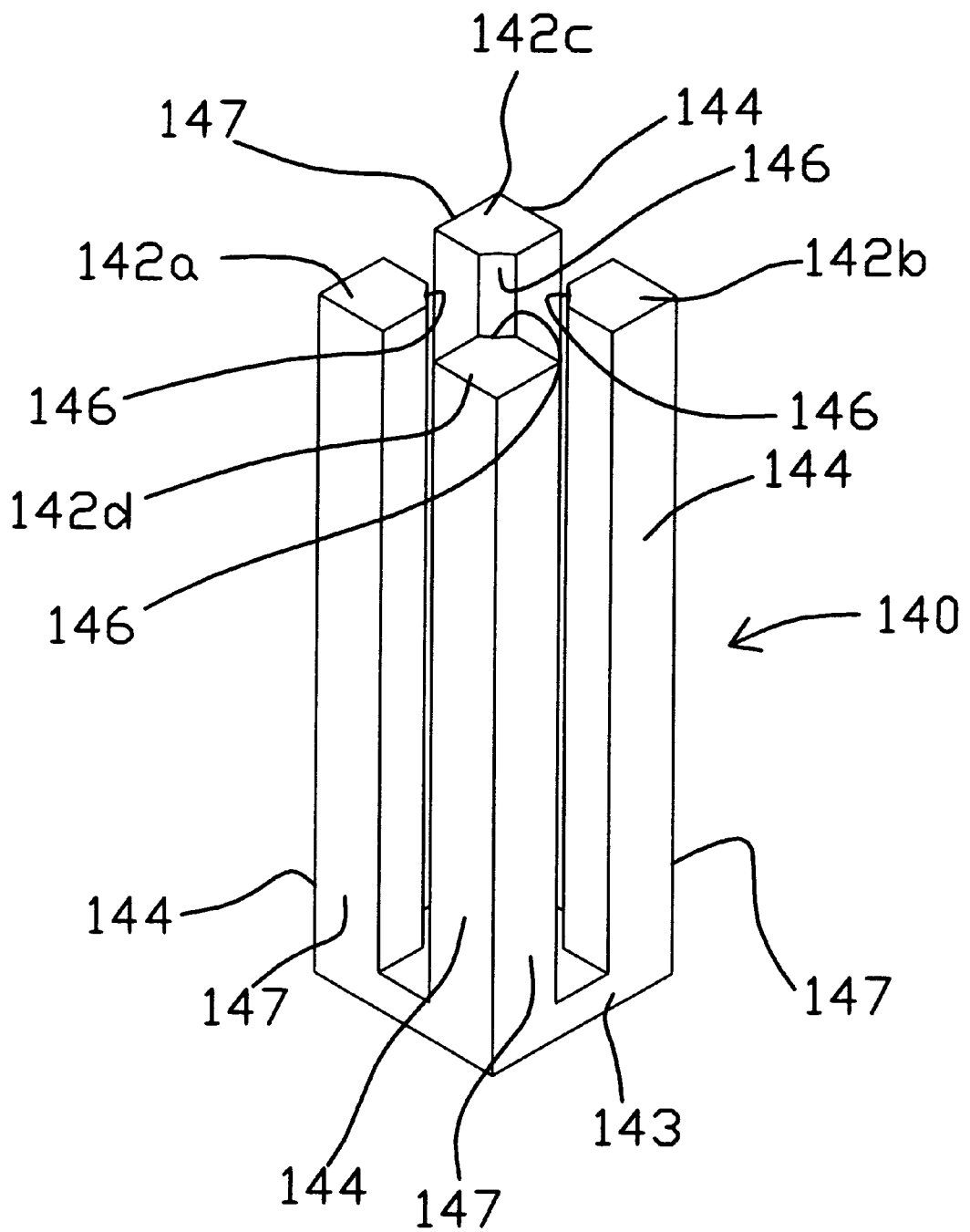
FIG. 4 is an alternative embodiment of an expandable key member of the actuator assembly.

FIG. 4 shows an alternative embodiment for a key member in accordance with the present invention. Similar to key member 40 shown in FIGS. 1–3 and described above, key member 140 is comprised of a plurality of elongated members 142*a*–142*d* having first, second, and third surfaces 144, 146, and 147, respectively. Key member 140 further includes an attachment member 143 to which members 142*a*–142*d* are secured. In the embodiment shown, attachment member 143 is planar, and members 142*a*–142*d* are secured at a base portion of the elongated members 142*a*–142*d* to attachment member 143. Key member 140 having attachment member 143 conveniently holds the individual elongated members 142*a*–142*d* together as the key member 140 is inserted into the connection holes. Attachment member 143 of key member 140 can also be sized and shaped to match the configuration of the connection holes of the actuator assembly in which it is used. In this manner, attachment member 143 allows for the better placement of the expandable key in the connection holes. Upon being inserted into the connection holes, key member 140 is engaged by a driver pin in a manner similar to that described above.

Although the present invention has been described with reference to preferred embodiments, those skilled in the art will recognize that changes may be made in form and detail without departing from the spirit and scope of the invention.

What is claimed is:

1. An actuator assembly for an information storage device, comprising:

an actuator block having a connection hole formed therein, the connection hole having a perimeter edge of predetermined shape, the predetermined shape of the actuator block connection hole having a non-circular portion;

an elongated arm extending from the actuator block, the elongated arm having a connection hole with a perimeter edge of predetermined shape and aligned with the actuator block connection hole, the predetermined shape of the elongated arm connection hole having a non-circular portion; and an expandable key that is separate from the actuator block and the elongated arm, wherein the expandable key is inserted in the actuator block connection hole and the elongated arm connection hole and transversely expanded to engage at least the non-circular portion of the perimeter edge of the actuator block connection hole and at least the non-circular portion of the perimeter edge of the elongated arm connection hole to provide a mechanical interface between the expandable key and the actuator block and the elongated arm, the mechanical interface securing the elongated arm to the actuator block and for preventing rotation between the elongated arm and the actuator block, the expandable key comprising:

a key member having a longitudinal bore, the key member being inserted through the actuator block connection hole and the elongated arm connection hole; and a driver pin inserted in the longitudinal bore of the member, the driver pin engaging and transversely expanding the key member into an expanded state wherein the key member engages the non-circular portion of the perimeter edge of the actuator block connection hole and the non-circular portion of the perimeter edge of the elongated arm connection hole.

2. The actuator assembly of claim 1, wherein:

the non-circular portion of the perimeter edge of the actuator block connection hole has at least one linear side that is engaged by the key member; and the non-circular portion of the perimeter edge of the elongated arm connection hole has at least one linear side that is engaged by the key member.

3. The actuator assembly of claim 2, wherein the perimeter edge of the actuator block connection hole has a first polygon shape, and the perimeter edge of the elongated arm connection hole has a second polygon shape.

4. The actuator assembly of claim 3, wherein the perimeter edge of the elongated arm connection hole is the same shape as the perimeter edge of the actuator block connection hole.

5. The actuator assembly of claim 4, wherein the actuator block connection hole and the elongated arm connection hole are square.

6. The actuator assembly of claim 1, wherein the key member is comprised of a plurality of elongated members, each elongated member having at least a first surface in contact with the non-circular portion of the perimeter edge of the actuator block connection hole and the non-circular perimeter edge of the elongated arm connection hole and a second surface in contact with the driver pin, the elongated members being radially moveable when the driver pin is removed from the longitudinal bore.

7. The actuator assembly of claim 6, wherein the key member includes four elongated members.

8. The actuator assembly of claim 6, wherein the key member further includes an attachment member to which the plurality of elongated members are secured.

9. The actuator assembly of claim 1, wherein the key member is radially compressible and removable from the actuator block connection hole and the elongated arm connection hole upon removal of the driver pin from the longitudinal bore for removing the elongated arm secured to the actuator block.

10. The actuator assembly of claim 1, wherein:

the longitudinal bore of the key member is cylindrical having a diameter; and the driver pin is cylindrical having a diameter that is greater than the diameter of the longitudinal bore.

11. The actuator assembly of claim 1, wherein the elongated arm comprises:

an actuator arm having a proximal and a distal end, the proximal end of the actuator arm attached to the actuator block; and a head suspension mounted to the distal end of the actuator arm.

12. The actuator assembly of claim 1, further including a plurality of elongated arms extending from the actuator block, each of the elongated arms being removably attached to the actuator block.

13. A magnetic disk drive data storage device comprising:

a magnetic disk mounted within the data storage device for storing data; and an actuator assembly for supporting and positioning a read/write head over the magnetic disk, comprising:

an actuator block having a connection hole formed therein, the connection hole having a perimeter edge of predetermined shape, the predetermined shape of the actuator block connection hole having a non-circular portion;

an elongated arm extending from the actuator block, the elongated arm having a connection hole with a perimeter edge of predetermined shape and aligned with the actuator block connection hole, the predetermined shape of the elongated arm connection hole having a non-circular portion;

a key member that is separate from the actuator block and the elongated arm and that includes a longitudinal bore, the key member being inserted through the actuator block connection hole and the elongated arm connection hole; and a driver pin inserted in the longitudinal bore of the key member, the driver pin engaging and transversely expanding the key member into engagement with the non-circular portion of the perimeter edge of the actuator block connection hole and the non-circular portion of the elongated arm connection hole to provide a mechanical interface between the key member and the actuator block and the elongated arm, the mechanical interface securing the elongated arm to the actuator block and for preventing rotation between the elongated arm and the actuator block.

* * * * *

UNITED STATES PATENT AND TRADEMARK OFFICE
CERTIFICATE OF CORRECTION

PATENT NO : 6,078,469
DATED : June 20, 2000
INVENTOR(S) : Mark T. Girard

It is certified that error appears in the above-identified patent and that said Letters Patent are hereby corrected as shown below:

Column 6, line 58, before "member" insert --key--

Signed and Sealed this

First Day of May, 2001

NICHOLAS P. GODICI

Attest:

Attesting Officer

Acting Director of the United States Patent and Trademark Office